(12) United States Patent
Naito

(10) Patent No.: US 11,330,179 B2
(45) Date of Patent: May 10, 2022

(54) IMAGING DEVICE AND CONTROL METHOD THEREOF

(71) Applicant: CANON KABUSHIKI KAISHA, Tokyo (JP)

(72) Inventor: Go Naito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/158,764

(22) Filed: Jan. 26, 2021

(65) Prior Publication Data

US 2021/0235017 A1 Jul. 29, 2021

(30) Foreign Application Priority Data

Jan. 28, 2020 (JP) .............................. JP2020-011299

(51) Int. Cl.
*H04N 5/232* (2006.01)
*H04N 5/355* (2011.01)

(52) U.S. Cl.
CPC ..... *H04N 5/23254* (2013.01); *H04N 5/23267* (2013.01); *H04N 5/35554* (2013.01)

(58) Field of Classification Search
None
See application file for complete search history.

(56) References Cited

U.S. PATENT DOCUMENTS

| | | | |
|---|---|---|---|
| 10,750,098 B2 | 8/2020 | Fujinami | |
| 2013/0258089 A1* | 10/2013 | Lyons | H04N 5/2257 348/77 |
| 2014/0354834 A1* | 12/2014 | Narita | H04N 5/23287 348/208.4 |
| 2015/0029349 A1* | 1/2015 | Ben Israel | H04N 5/23258 348/208.4 |
| 2015/0371090 A1* | 12/2015 | Miyasako | H04N 5/772 386/241 |
| 2016/0057445 A1* | 2/2016 | Tsubaki | H04N 19/521 382/236 |
| 2017/0019612 A1* | 1/2017 | Kino | H04N 5/23254 |
| 2017/0064201 A1* | 3/2017 | Tsuchiya | H04N 5/23229 |
| 2017/0094239 A1* | 3/2017 | Tsuchiya | H04N 5/23296 |
| 2017/0134659 A1* | 5/2017 | Miyahara | H04N 5/23254 |
| 2017/0366729 A1* | 12/2017 | Itoh | H04N 5/2355 |
| 2019/0297242 A1* | 9/2019 | Terauchi | H04N 5/349 |
| 2019/0370937 A1* | 12/2019 | Tanimoto | H04N 5/23232 |

FOREIGN PATENT DOCUMENTS

JP 2018-0064201 A 4/2018

* cited by examiner

*Primary Examiner* — James M Hannett
(74) *Attorney, Agent, or Firm* — Cowan, Liebowitz & Latman, P.C.

(57) ABSTRACT

An imaging device includes: an imaging element configured to capture an image using a luminous flux passing through an imaging optical system; a blur corrector configured to move a part of the imaging optical system or the imaging element; a movement detection unit configured to detect the motion of a main subject; and an imaging control unit configured to perform control so that multiple imaging is performed on the main subject under different imaging conditions to obtain a plurality of images to be combined. The imaging control unit causes the blur corrector to be driven so that the motion of the main subject detected by the movement detection unit is reduced in the multiple imaging.

12 Claims, 5 Drawing Sheets

IMAGING DEVICE AND CONTROL METHOD THEREOF

BACKGROUND OF THE INVENTION

Field of the Invention

The present invention relates to an imaging device and a control method thereof.

Description of the Related Art

In the related art, various techniques for combining and creating one image from a plurality of images have been proposed. For example, high dynamic range imaging (hereinafter referred to as "HDR imaging") in which a plurality of images having different exposure periods are combined to expand a dynamic range of the images is known. Furthermore, for example, high resolution imaging (hereinafter referred to as "high-resolution imaging") in which an imaging element is moved in parallel slightly and performs imaging when acquiring a plurality of images and high-resolution images are combined is also known.

Since multiple imaging is performed in HDR imaging and high-resolution imaging, a time required to complete all of the imaging in HDR imaging and high-resolution imaging is generally longer than that of normal imaging. For this reason, a subject may move when a plurality of images are acquired, which may cause a decrease in the resolution of the subject in a combined image.

On the other hand, for example, Japanese Patent Laid-Open No. 2018-64201 describes a technique for detecting motion between a plurality of images in HDR imaging and changing a combination ratio of each pixel at the time of performing combining in accordance with the detected amount of motion.

However, if a combination ratio is changed in accordance with an amount of motion as in Japanese Patent Laid-Open No. 2018-64201, the larger areas of motion in the image are combined so that the image obtained with shorter exposures is used. For this reason, a combined image which is contrary to a user's intention is likely to be created when a moving subject is desired to be captured with proper exposure and the like. Furthermore, when a plurality of captured images are subjected to alignment and combination in accordance with motion of a subject using the same technique for detecting the motion of the subject, an angle of view of an image obtained at the time of performing combining is narrower than that of the acquired image.

SUMMARY OF THE INVENTION

An imaging device that is an example of the present invention includes: an imaging element configured to capture an image using a luminous flux passing through an imaging optical system; a blur corrector configured to move a part of the imaging optical system or the imaging element; and at least one processor and at least one memory functioning as: a movement detection unit configured to detect the motion of a main subject; and an imaging control unit configured to perform control so that multiple imaging is performed on the main subject under different imaging conditions to obtain a plurality of images to be combined. The imaging control unit causes the blur corrector to be driven so that the motion of the main subject detected by the movement detection unit is reduced in the multiple imaging.

Further features of the present invention will become apparent from the following description of exemplary embodiments with reference to the attached drawings.

DESCRIPTION OF THE EMBODIMENTS

Figure 1A:
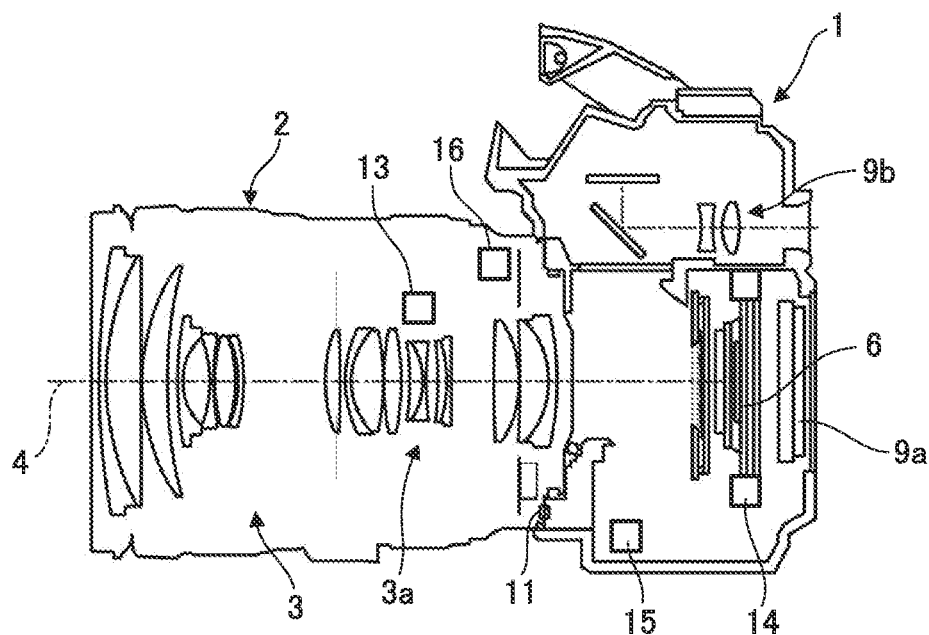
FIG. 1A is a diagram illustrating an example of a configuration of an optical system of an imaging device in a first embodiment and FIG. 1B is a block diagram illustrating an electrical configuration of the imaging device in the first embodiment.

Embodiments of the present invention will be described in detail below with reference to the drawings and the like. In each drawing, the same constituent elements will be denoted by the same reference numerals and a duplicate description thereof will be omitted.

First Embodiment

An imaging device in a first embodiment will be described below with reference to FIGS. 1 to 4.

Figure 1B:
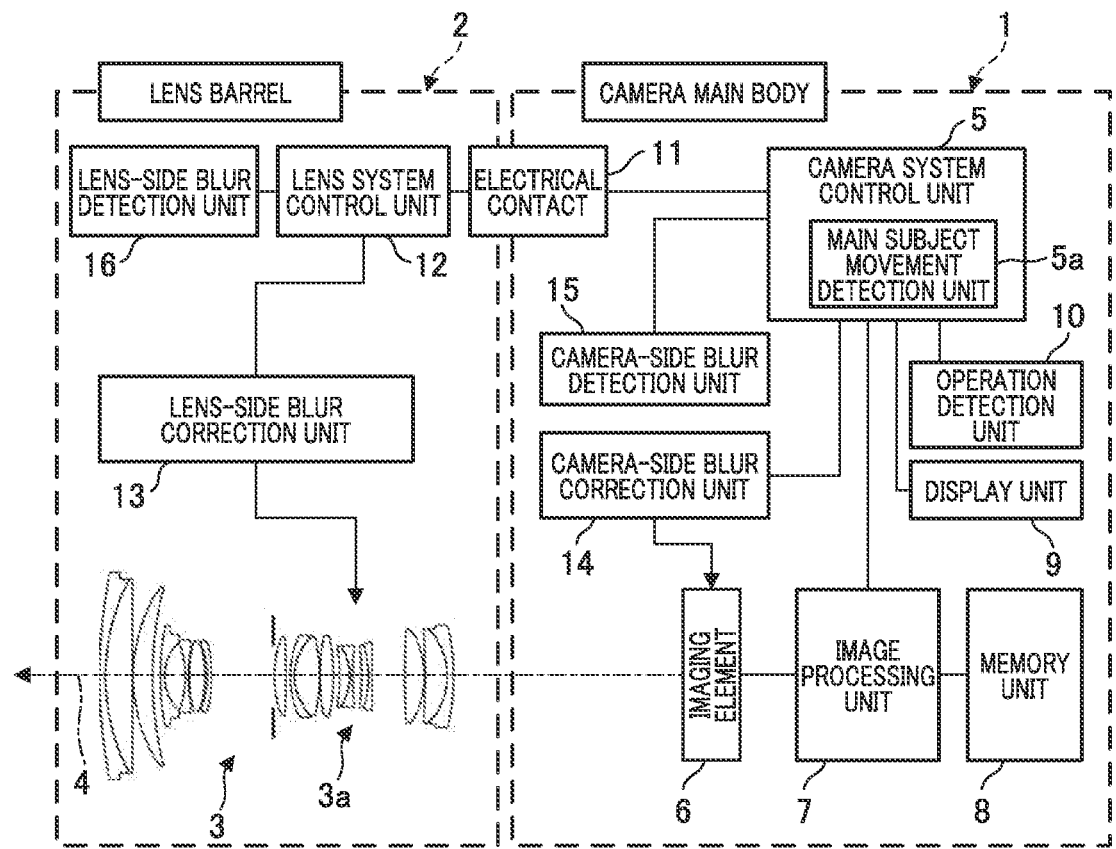

FIG. 1A is a diagram illustrating an example of a configuration of an optical system of the imaging device in the first embodiment and FIG. 1B is a block diagram illustrating an electrical configuration of the imaging device in the first embodiment.

The imaging device in the first embodiment is an electronic camera with interchangeable lenses and includes a camera main body 1 and a lens barrel 2 which is attachable to and detachable from the camera main body 1. Although an example of a configuration of an interchangeable lens camera will be described in the first embodiment, the imaging device of the present invention may have a configuration in which lens replaceability is not presupposed.

First, a configuration of the lens barrel 2 will be described.

The lens barrel 2 includes an imaging optical system 3, a lens system control unit 12, a lens-side blur correction unit 13, and a lens-side blur detection unit 16.

The imaging optical system 3 includes a plurality of lenses configured to perform operations such as zooming and focusing and forms an optical image using a luminous flux from a subject on an imaging surface of an imaging element 6 which will be described later. The imaging optical system 3 includes a blur correction lens 3a configured to perform blur correction. In FIGS. 1A and 1B, an optical axis of the imaging optical system 3 will be denoted by reference numeral 4.

The lens system control unit 12 is a processor configured to control the lens barrel 2 side. In a state in which the lens barrel 2 is installed in the camera main body 1, the lens system control unit 12 communicates with the camera main body 1 via an electrical contact 11. Thus, the camera main body 1 and the lens barrel 2 cooperate with each other to perform control when the imaging device performs imaging.

The lens-side blur correction unit 13 drives the blur correction lens 3a in a plane orthogonal to an optical axis 4. The lens-side blur correction unit 13 is constituted of, for example, a voice coil motor (VCM), a linear actuator such as a stepping motor combined with a lead screw, or the like. It is possible to correct image blur occurring on the imaging surface of the imaging element 6 using such movement of the lens-side blur correction unit 13.

The lens-side blur detection unit 16 is a gyro sensor arranged inside the lens barrel 2 and detects an angular velocity of blur in each direction as an amount of blur of the imaging device.

A configuration of the camera main body 1 will be described below.

The camera main body 1 includes a camera system control unit 5, the imaging element 6, an image processing unit 7, a memory unit 8, a display unit 9, an operation detection unit 10, a camera-side blur correction unit 14, and a camera-side blur detection unit 15.

The camera system control unit 5 is an example of an imaging control unit and is a processor configured to control the camera main body 1 side. The camera system control unit 5 generates a timing signal at the time of performing imaging and outputs the generated timing signal to each unit of the imaging device. For example, the camera system control unit 5 controls operations or the like of the imaging element 6 and the image processing unit 7 in response to the detection of pressing of a release button (not shown) using the operation detection unit 10 and performs imaging processing. Furthermore, the camera system control unit 5 controls a display state of each segment formed to display information in the display unit 9.

Also, the camera system control unit 5 includes a main subject movement detection unit 5a configured to detect motion of a main subject included in an image on the basis of an image signal of the image processing unit 7. The main subject movement detection unit 5a is an example of a movement detection unit.

Also, the imaging element 6 captures an image of a subject using a luminous flux passing through the imaging optical system 3 and outputs an image signal. The imaging element 6 is constituted of, for example, an XY address type complementary metal oxide semiconductor (CMOS) image sensor or the like. An image signal output from the imaging element 6 is subjected to image processing using the image processing unit 7 and then recorded in the memory unit 8.

The image processing unit 7 includes an analog/digital (AD) converter, a white balance adjustment circuit, a gamma correction circuit, an interpolation calculation circuit, and the like therein and performs various signal processing on an image signal output from the imaging element 6. Furthermore, the image processing unit 7 performs compression on images, sounds, and the like using a predetermined method.

Also, the image processing unit 7 also outputs an image signal to the camera system control unit 5. Thus, the camera system control unit 5 can obtain information regarding an amount of focus evaluation and an amount of exposure on the basis of an image signal from the imaging element 6. Furthermore, the camera system control unit 5 can output an image formed to be presented to a user to the display unit 9.

The image processing unit 7 can also generate a blur detection signal on the basis of a comparison between a plurality of images obtained from the imaging element 6. For this reason, the function of the camera-side blur detection unit 15 may also be performed using the imaging element 6 and the image processing unit 7.

The memory unit 8 records or reads various data on a recording medium (not shown). The memory unit 8 records moving image data and still image data supplied from the image processing unit 7 on the recording medium, for example, when instructed to record an image. The above-described recording medium is constituted of, for example, a recording medium such as a semiconductor memory, a hard disk, or the like. The recording medium may be attachable to and detachable from the camera main body 1 and may be installed in the camera main body 1.

The display unit 9 includes a display element capable of displaying an image and has a function of displaying a so-called live view image, setting menu image, recorded image, or the like and presenting the image to a user. For example, as illustrated in FIG. 1A, the display unit 9 includes a rear display device 9a provided on a back surface of the camera main body 1 and an electronic viewfinder (ENT) 9b provided in a finder of the camera main body 1. The rear display device 9a may include a touch panel. In this case, the rear display device 9a also functions as an operation unit.

The operation detection unit 10 receives a signal from the operation unit including, for example, the release button (not shown) and detects various operations of a user.

The camera-side blur correction unit 14 is an example of a blur correction unit and moves the imaging element 6 in a plane orthogonal to the optical axis 4. It is possible to correct image blur occurring on the imaging surface of the imaging element 6 due to the blur of the imaging device using such movement of the imaging element 6.

The camera-side blur detection unit 15 is a gyro sensor arranged inside the camera main body 1 and detects an angular velocity of blur in each direction as an amount of blur of the imaging device as in the lens-side blur detection unit 16.

Here, an adjustment operation of the imaging optical system 3 in the imaging device is performed as follows.

The camera system control unit 5 and the lens system control unit 12 control operations of each unit of the imaging device in accordance with operations of various operation units (not show) provided in the camera main body 1 and the lens barrel 2. Thus, it is possible to capture still images and moving images.

During an imaging operation of the imaging device, images of the field of view are sequentially acquired using the imaging element 6 at a predetermined frame rate. The camera system control unit 5 receives an image signal from the imaging element 6 and the image processing unit 7.

The camera system control unit 5 obtains an amount of focus evaluation by, for example, performing an autofocus calculation of a contrast detection method using the above image signal. Furthermore, the camera system control unit 5 adjusts a focal position of the imaging optical system 3 via the lens system control unit 12 so that a subject image is formed in the vicinity of an imaging surface using the amount of focus evaluation.

Also, the camera system control unit 5 performs an exposure calculation using, for example, the image signal. Furthermore, the camera system control unit 5 controls an aperture included in the imaging optical system 3 via the lens system control unit 12 on the basis of the result of the exposure calculation. The camera system control unit 5 may adjust a shutter speed, an ISO sensitivity, and the like on the basis of the result of the exposure calculation.

Also, the camera system control unit 5 in an imaging mode in which blur correction is performed controls the camera-side blur correction unit 14 on the basis of a signal of the camera-side blur detection unit 15. Similarly, the camera system control unit 5 controls the lens-side blur correction unit 13 on the basis of a signal of the lens-side blur detection unit 16.

To be specific, the camera system control unit 5 generates a camera shake signal from an angular velocity of the blur detected by the camera-side blur detection unit 15. Similarly, the lens system control unit 12 generates a camera shake signal from an angular velocity of the blur detected by the lens-side blur detection unit 16.

The camera system control unit 5 and the lens system control unit 12 calculate amounts of driving of the imaging element 6 and the blur correction lens 3*a* configured to correct camera shake using the camera shake signal. After that, each of the calculated amounts of driving is sent, as a command value, to the camera-side blur correction unit 14 and the lens-side blur correction unit 13. Thus, the imaging element 6 is moved through the driving of the camera-side blur correction unit 14 and the blur correction lens 3*a* is moved through the driving of the lens-side blur correction unit 13.

Also, a case in which the deterioration of the image quality of a combined image due to the motion of the subject is prevented while variations in the angle of view at the time of combining are reduced by moving the imaging element 6 using the camera-side blur correction unit 14 to minimize the motion of the main subject will be described in the embodiment. However, the present invention is not limited thereto and the blur correction lens 3*a* may be driven using the lens-side blur correction unit 13. In this case, the lens system control unit 12 can function as a part of the imaging control unit and the lens-side blur correction unit 13 can also function as a blur correction unit.

HDR imaging will be described below. When the HDR imaging is performed in this embodiment, first, the camera system control unit 5 determines appropriate exposure conditions (a shutter speed, an aperture value, an ISO sensitivity, and the like) on the basis of information regarding the amount of exposure obtained from the imaging element 6 at the time of preparation tor imaging. Furthermore, the camera system control unit 5 performs imaging a plurality of times by changing a shutter speed to expand a dynamic range and obtains each of images with over-exposure, proper exposure, and under-exposure.

At this time, the camera system control unit 5 detects the motion of the main subject using the main subject movement detection unit 5*a* and causes the imaging element 6 to be moved using the camera-side blur correction unit 14 so that a subject position within the angle of view is constant in each imaging. An image obtained by expanding a dynamic range is generated when the camera system control unit 5 performs HDR combination processing using the three images obtained through the above imaging.

High-resolution imaging will be described below. When high-resolution imaging is performed in this embodiment, first, the camera system control unit 5 determines proper exposure conditions (a shutter speed, an aperture value, an ISO sensitivity, and the like) on the basis of information regarding the amount of exposure obtained from the imaging element 6 at the time of preparation for imaging. Furthermore, the camera system control unit 5 performs imaging a plurality of times under the same imaging conditions while slightly moving the position of the imaging element 6 using the camera-side blur correction unit 14 to improve the resolution compared with that before the combination.

At this time, the camera system control unit 5 detects the motion of the main subject using the main subject movement detection unit 5*a* and calculates an amount of motion of the imaging element 6 in which the subject position within the angle of view is constant in each imaging. The camera system control unit 5 corrects the calculated amount of movement of the imaging element 6 by adding a minute movement amount of the imaging element 6 in high-resolution imaging. Furthermore, the camera system control unit 5 causes the imaging element 6 to be moved by an amount of movement after the correction using the camera-side blur correction unit 14. When the camera system control unit 5 performs combination processing using a plurality of images obtained through the above imaging, an image with the improved subject resolution is generated.

The imaging operation in the first embodiment will be described below with reference to FIGS. 2A to 2C.

Figure 2A:
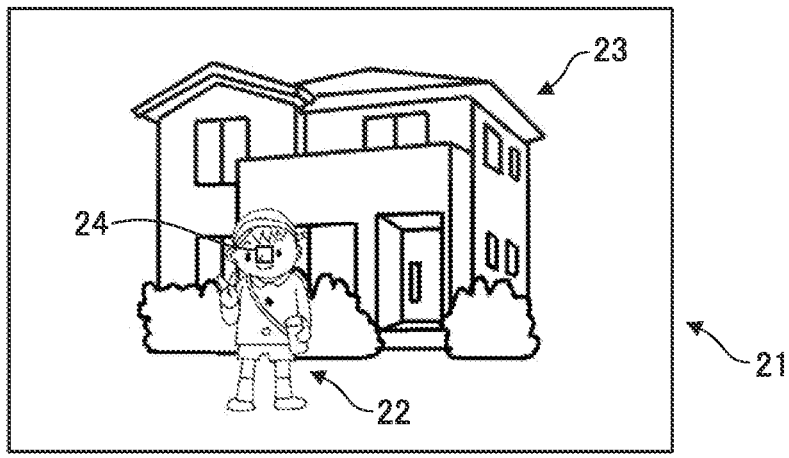
FIGS. 2A and 2B are diagrams illustrating an example of an image presented on a display unit and FIG. 2C is a diagram illustrating an example of a combined image in the first embodiment.

FIG. 2A illustrates a subject image at a time at which multiple imaging is started. FIG. 2B illustrates a subject image at an arbitrary time during multiple imaging. Furthermore, FIG. 2C illustrates an example of an image in which a position of an imaging element is controlled so that a position of a subject is constant, multiple imaging is performed, and the results are combined.

Figure 2B:
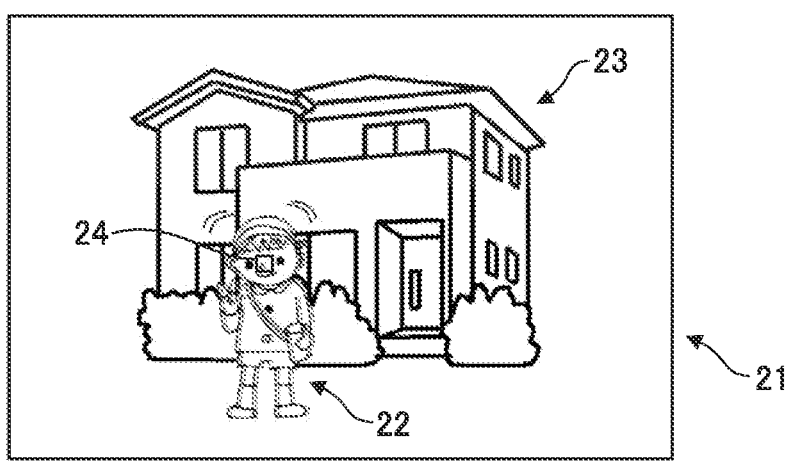

FIGS. 2A and 2B illustrate images 21 presented in an EVF 9*b*. Each of the images 21 includes a main subject (a person in this embodiment) 22 and a background (a building in this embodiment) 23. In the images 21 of FIGS. 2A and 2B, focus points 24 for focusing at the time of imaging are displayed superimposed thereon. Each position of the focus points 24 can be arbitrarily changed by a user and FIGS. 2A and 2B illustrate states in which a face of the main subject 22 is selected as one of the focus points 24.

A case in which the motion of the main subject 22 is detected using a subject in the vicinity of the focus points 24 as the main subject 22 will be described in this embodiment. However, in the case of the imaging device having a line-of-view detection function, the main subject 22 may be set on the basis of a point (a gaze point) viewed by the user instead of the focus points 24 and the motion of the subject may be detected.

Figure 2C:
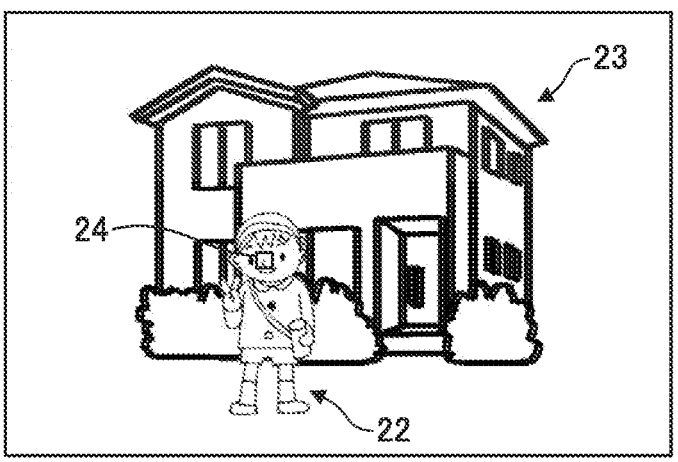

In the example of FIGS. 2A to 2C, the imaging operation in the case of the HDR imaging will be described as an example. If the user selects the mode in which HDR imaging is performed and imaging using the imaging device is started for example, an image having the same composition as in FIG. 2A is acquired. If the main subject 22 moves before the next imaging is performed, as illustrated in FIG. 2B, an image in which the main subject 22 is blurred is acquired.

However, in this embodiment, the camera system control unit 5 causes the imaging element 6 to be moved using the camera-side blur correction unit 14 in accordance with the motion of the main subject 22 detected by the main subject movement detection unit 5*a* and then performs imaging. The operation of the main subject movement detection unit 5*a* at this time will be described later with reference to FIGS. 3A and 3B. If multiple imaging used for combining is performed and then the images are combined so that the position of the main subject 22 is constant, an image combined in a state in which the position of the main subject 22 is as illustrated in FIG. 2C is acquired.

Here, a case in which, when multiple imaging is performed, the imaging element 6 is not moved using the camera-side blur correction unit 14 and alignment and combination are performed so that the position of the main subject 22 is constant after the imaging is considered. In this case, places in which images cannot be superimposed occur in a peripheral portion of the image instead of where the position of the main subject 22 is aligned. Furthermore, when a combined image is created by cutting out only a portion in which the images are appropriately superimposed at the time of combining, an event in which an angle of view changes from that at the time of imaging occurs.

On the other hand, when imaging is performed and combining is performed so that the position of the main subject 22 is constant at the time of each imaging as in this embodiment, it is possible to prevent deterioration of the image quality of the combined image due to the motion of the subject while variations in the angle of view are reduced.

In this embodiment, the building in the background 23 is likely to be combined in a slightly shifted state. However, it is conceivable that there may be no major problem even if the building is combined in a slightly shifted state such as when the building is further outside a depth of field than the main subject in some cases.

Also, in the case of HDR imaging, the camera system control unit 5 may perform a change concerning whether to move the imaging element 6 through the motion of the main subject in accordance with the imaging conditions when the multiple imaging is performed. For example, the camera system control unit 5 may cause the imaging element 6 not to be moved in accordance with the motion of the main subject 22 when imaging is performed under the imaging conditions in which the exposure of a region of the background 23 is appropriate with reference to the brightness of the region of the background 23.

Furthermore, the camera system control unit 5 may determine whether to move the imaging element 6 using the camera-side blur correction unit 14 with reference to the amount of motion of the main subject detected using the main subject movement detection unit 5a. For example, the camera system control unit 5 may cause the imaging element 6 to be moved when the detected amount of motion of the main subject is larger than a predetermined threshold value.

In this embodiment, when multiple imaging used for combining is performed, it is assumed that an image displayed on the display unit 9 is acquired during each imaging and the main subject movement detection unit 5a detects the motion of the main subject using this display image. However, the configuration of the present invention is not limited to the above and the main subject movement detection unit 5a may acquire an image for detecting the motion of the main subject from a unit other than the imaging element 6.

An operation of the main subject movement detection unit 5a will be described below with reference to FIGS. 3A and 3B.

Figure 3A:
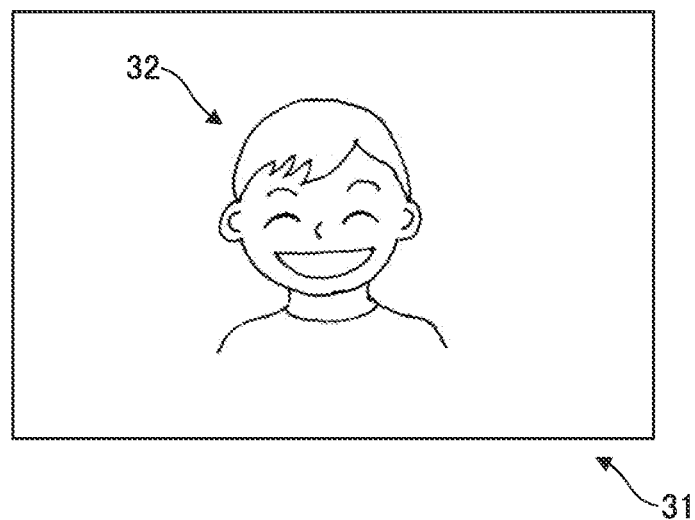
FIGS. 3A and 3B are diagrams illustrating an example of an operation of a main subject movement detection unit.
Figure 3B:
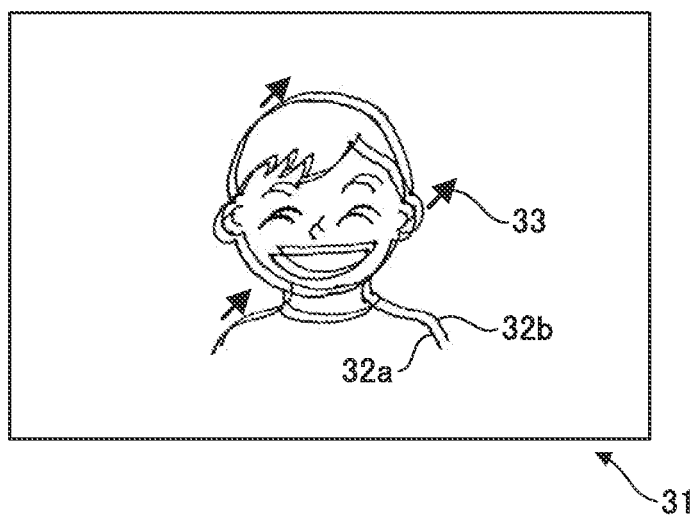

FIGS. 3A and 3B illustrate images 31 presented in the EVF 9b. The image of 3B is an image acquired after the process associated with FIG. 3A. Each of the images 31 includes a main subject (a person in this embodiment) 32.

In the images 31 of FIGS. 3A and 3B, the main subject 32 has slightly moved due to a time change. In FIG. 3B, although states (32a and 32b) before and after the motion of the main subject 32 are displayed by being superimposed to make the difference easy to understand, an image actually presented in an EVF 9a at the time of FIG. 3B includes only the main subject 32b. Furthermore, FIG. 3B also illustrates a motion vector 33 indicating a movement direction and an amount of motion of the main subject 32.

Also, although the focus points 24 described associated with FIGS. 2A to 2C are omitted in FIGS. 3A and 3B, it is assumed that a focus point is also set on a face of the main subject 32 in FIGS. 3A and 3B. That is to say, also in FIGS. 3A and 3B, the main subject selected by the user is a face of a person.

The main subject movement detection unit 5a, calculates the motion vector 33 of the main subject 32 on the basis of the captured image 31 of the main subject 32a and the main subject 32b as illustrated in FIG. 3B. For example, the main subject movement detection unit 5a calculates the motion vector 33 by detecting similar feature points from two images as in so-called template matching and detecting the motion of the two images. It is possible to perform multiple imaging while keeping the position of the main subject 32 in the captured image constant by moving the imaging element 6 in accordance with a direction and an amount of movement of the motion vector 33 calculated using the main subject movement detection unit 5a.

The movement detection using the main subject movement detection unit 5a is not limited thereto and other methods may be used as long as the motion of the main subject can be detected between images acquired at different times.

Figure 4:
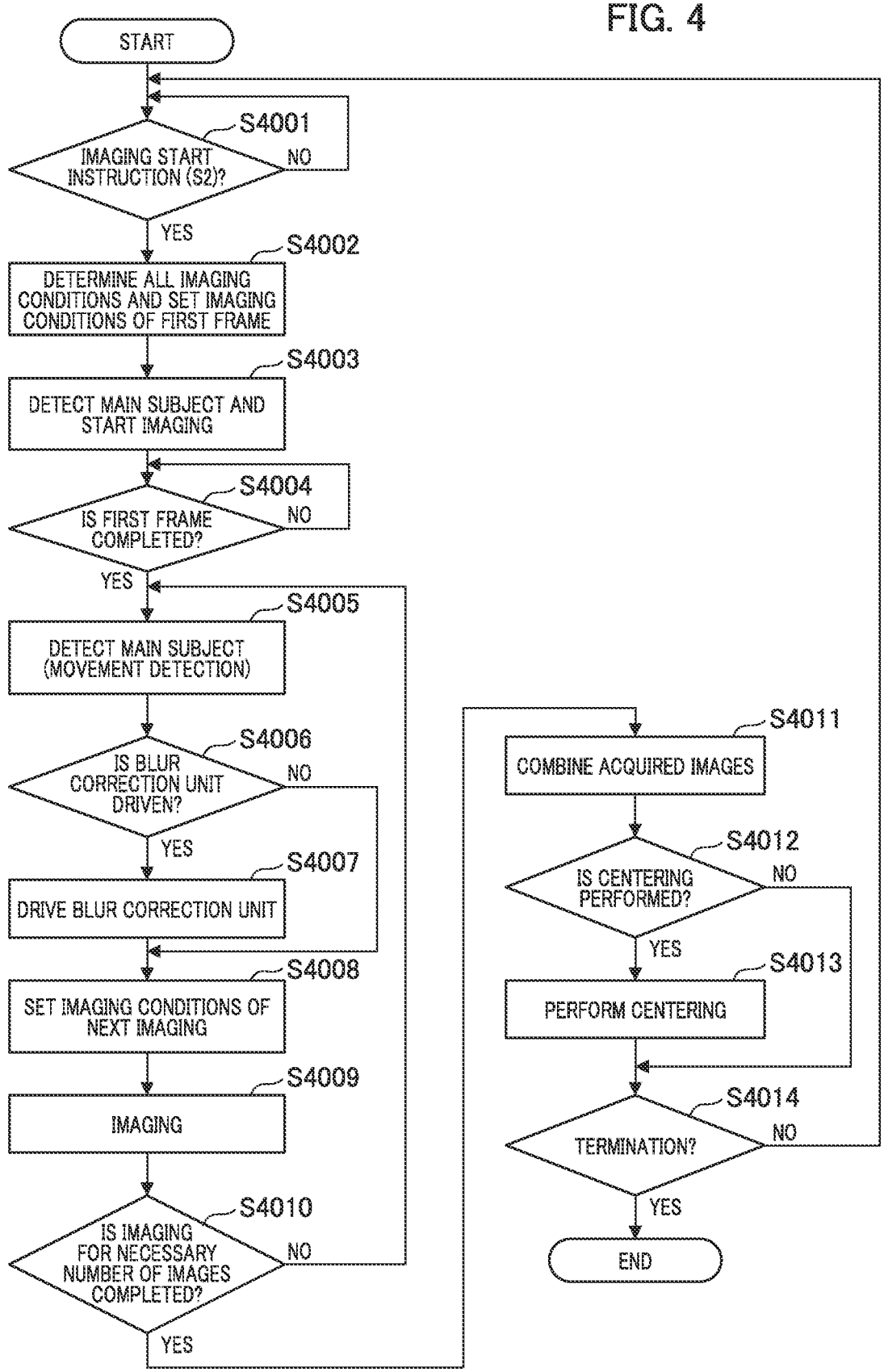
FIG. 4 is a flowchart illustrating an example of an operation of the imaging device in the first embodiment.

FIG. 4 is a flowchart for describing an example of the operation of the imaging device in the first embodiment.

The process of FIG. 4 is started in response to, for example, an imaging preparation instruction for HDR imaging or high-resolution imaging (a so-called release button half-press; an S1 operation).

In Step S4001, the camera system control unit 5 determines whether an imaging start instruction (a so-called release button half-press; an S2 operation) is received from the user. When the imaging start instruction has been received, the process proceeds to the process of Step S4002. On the other hand, when the imaging start instruction has not been received, the camera system control unit 5 waits for an imaging start instruction from the user.

In Step S4002, the camera system control unit 5 determines all of the imaging conditions for a plurality of times in HDR imaging or high resolution imaging on the basis of information regarding the amount of exposure acquired at the time of an imaging preparation state. The captured image used for combining of HDR imaging or high-resolution imaging is also referred to as a "first image." Furthermore, the camera system control unit 5 sets the imaging device to have the imaging conditions for a first frame of first image. Here, the imaging conditions include, for example, settings for an exposure time (a shutter speed), an ISO sensitivity, an aperture value, and the position of the imaging element 6 at the time of high-resolution imaging. After that, the process proceeds to the process of Step S4003.

In Step S4003, the camera system control unit 5 starts imaging of the first frame. At this time, the camera system control unit 5 detects the position of the main subject at the time of capturing the first frame on the basis of the position or the like of the focus point. The detection of the position of the main subject is used as information when the main subject movement detection unit 5a obtains the amount of motion of the main subject. The detection of the position of the main subject in Step S4003 may be performed using the first image and may be based on a live view image acquired before imaging of the first image.

After that, the process proceeds to the process of Step S4004.

In the multiple imaging started from Step S4003, normal camera shake correction using the camera-side blur correction unit 14 may be performed. For example, when a relatively slow shutter speed is provided in HDR imaging or high-resolution imaging, it is preferable to perform camera shake correction.

In Step S4004, the camera system control unit 5 determines whether the imaging of the first frame is completed.

When it is determined that the imaging is completed, the process proceeds to the process of Step S4005. On the other hand, when it is determined that the imaging is not completed, the camera system control unit 5 waits for the end of the imaging.

In Step S4005, the camera system control unit 5 captures an image (a live view image) to be presented on the display unit 9. This live view image is an example of a second image. At this time, the camera system control unit 5 detects the position of the main subject on the basis of the position or the like of the focus point. Furthermore, the main subject movement detection unit 5a calculates a motion vector (a movement direction and an amount of motion of the main subject) of the main subject from the position of the main subject of the previous imaging and the position of the main subject of the current imaging obtained using the above live view image. After that, the process proceeds to the process of Step S4006.

In Step S4006, the camera system control unit 5 determines whether to drive the camera-side blur correction unit 14 from the calculated amount of motion of the main subject (Step S4005) to reduce blurring of the main subject at the time of combining the images. For example, the camera system control unit 5 may determine that the camera-side blur correction unit 14 will be driven when the amount of motion of the main subject is larger than a predetermined amount (for example, an amount of movement to the extent that blurring of the main subject would be noticeable after the combining). When the camera-side blur correction unit 14 is driven to reduce blurring of the main subject, the process proceeds to the process of Step S4007. On the other hand, when the camera-side blur correction unit 14 is not driven to reduce blurring of the main subject, the process proceeds to the process of Step S4008.

In Step S4007, the camera system control unit 5 causes the camera-side blur correction unit 14 to be driven so that the motion of the main subject is reduced on the basis of the calculated motion vector of the main subject (Step S4005). After that, the process proceeds to the process of Step S4008.

In Step S4008, the camera system control unit 5 sets the imaging device for the imaging conditions of the next imaging. For example, in the case of HDR imaging, the camera system control unit 5 sets the shutter speed to have a value different from that of the shutter speed of the previous imaging. Furthermore, in the case of high-resolution imaging, the camera system control unit 5 causes the position of the imaging element 6 to be moved to a position slightly different from that at the time of the previous imaging. After that, the process proceeds to the process of Step S4009.

In Step S4009, the camera system control unit 5 performs imaging under the imaging conditions set in Step S4008. After that, the process proceeds to the process of Step S4010.

In Step S4010, the camera system control unit 5 determines whether imaging for a predetermined number of images is completed. When it is determined that the imaging is completed, the process proceeds to the process of Step S4011.

On the other hand, when it is determined that the imaging is not completed, the process returns to the process of Step S4005. In this case, the main subject is detected again (Step S4005) and the camera-side blur correction unit 14 is driven if necessary (Steps S4006 and S4007). Furthermore, the imaging device is set to have the imaging conditions of the next imaging (Step S4008) and then the imaging (Step S4009) is performed.

In Step S4011, the camera system control unit 5 performs HDR combination processing or high-resolution combination processing using each acquired captured image. In this embodiment, even when the main subject moves during a plurality of times of imaging, the position of the main subject in each image is made approximately constant within the angle of view through the driving of the camera-side blur correction unit 14. For this reason, when the above combination processing is performed, the angle of view in which images cannot be superimposed and are lost is reduced.

After that, the process proceeds to the process of Step S4012.

In Step S4012, the camera system control unit 5 determines whether to perform a centering operation for returning the position of the imaging element 6 to a center on the basis of the settings or the like of the user. When it is determined that the centering operation will be performed, the process proceeds to the process of Step S4013 and when it is determined that the centering operation will not be performed, the process proceeds to the process of Step S4014.

In Step S4013, the camera system control unit 5 performs the centering operation, drives the camera-side blur correction unit 14, and returns the position of the imaging element 6 to the center. After that, the process proceeds to the process of Step S4014.

Generally, it is desirable that the centering operation be performed in Step S4013 and a drive range of the camera-side blur correction unit 14 be kept wide state at the time of the next imaging. However, the centering operation involves variations in the angle of view. For example, in the situation in which continuous shooting of HDR imaging or high-resolution imaging is performed, it is desirable not to perform a centering operation because a shift in the position of the subject after the combining is likely to occur between before and after the centering operation. In this way, since the needs for the centering operation differ in accordance with the user's intention, the imaging situation, and the like, the camera system control unit 5 determines the necessity of a centering operation in Step S4012 described above.

In Step S4014, the camera system control unit 5 determines whether to end the operation of the imaging device on the basis of an input or the like of the user. When it is determined that the operation will be terminated, the process associated with FIG. 4 is terminated and when it is determined that the operation will not be terminated, the process returns to the process of Step S4001 and the above process is repeatedly performed.

As described above, in the imaging device in the first embodiment, during HDR imaging or high-resolution imaging, the camera-side blur correction unit 14 causes the imaging element 6 to be moved to reduce the motion of the main subject calculated using the main subject movement detection unit 5a. Thus, since the position of the main subject in each image before the combining is kept constant, it is possible to reduce variations in the angle of view during HDR imaging or high-resolution imaging and it is possible to reduce deterioration of the image quality of the main subject included in the combined image due to the motion of the subject.

Second Embodiment

An imaging device in a second embodiment has the same configuration as that of the first embodiment except for an imaging element 6 which will be describe later. For this reason, a duplicate description of all constituent elements of the second embodiment that are the same as those of the first embodiment will be omitted.

The imaging element 6 in the second embodiment has a configuration in which a first image for HDR imaging or high-resolution imaging and a second image for detecting a position of a main subject can be independently acquired on the same imaging surface. For example, the imaging element 6 in the second embodiment includes a second pixel group for acquiring a second image in addition to a first pixel group for acquiring a first image and has a configuration in which the first pixel group and the second pixel group can be read out independently of each other.

According to the above configuration, it is possible to acquire, as a second image, a live view image in parallel with the imaging of the first image for HDR imaging or high-resolution imaging and to detect the motion of the main subject using the second image.

Figure 5:
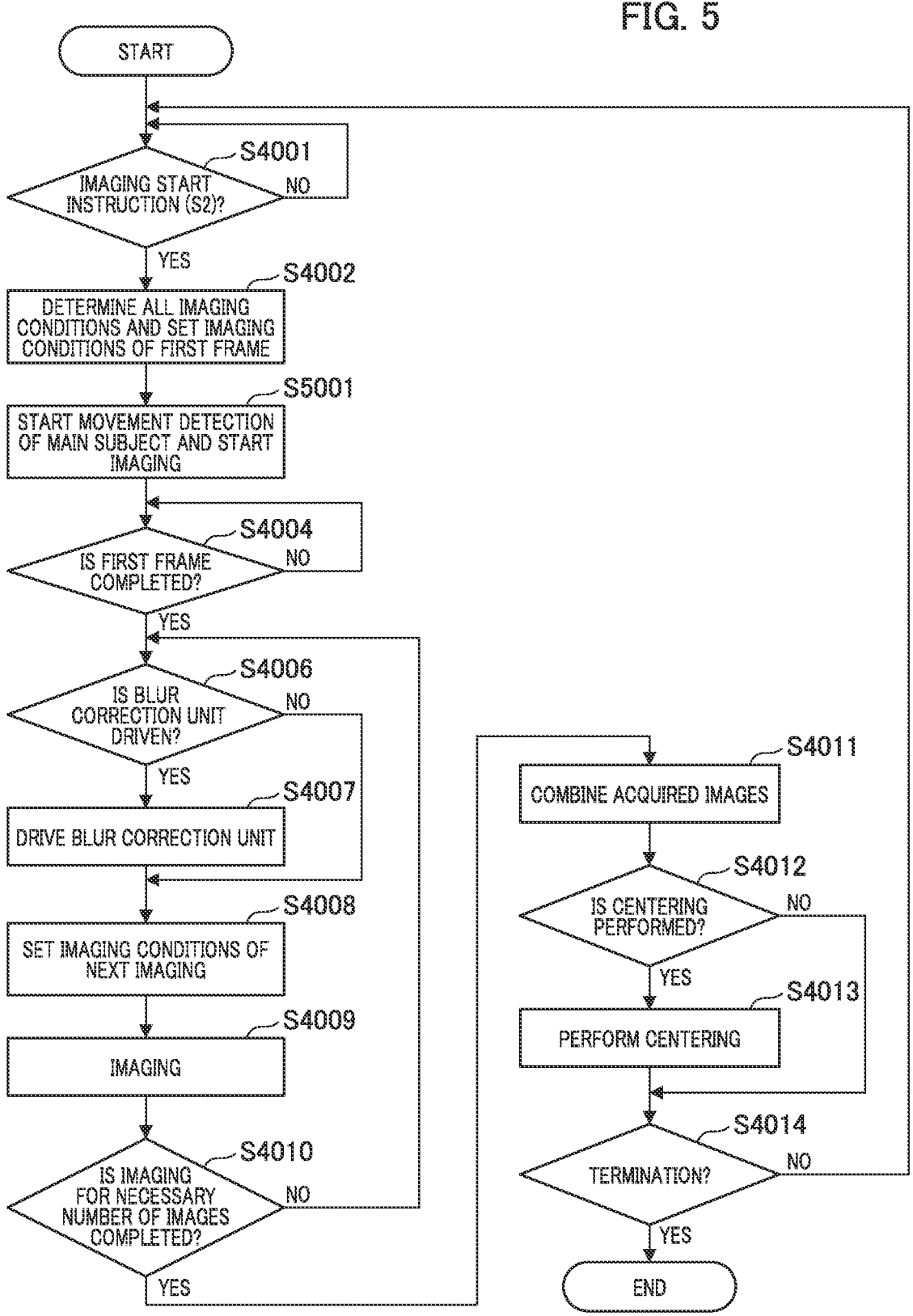
FIG. 5 is a flowchart illustrating an example of an operation of an imaging device in a second embodiment.

FIG. 5 is a flowchart for describing an example of an operation of the imaging device in the second embodiment.

As in the process of FIG. 4, the process of FIG. 5 also starts in response to, for example, an imaging preparation instruction for HDR imaging or high-resolution imaging (a so-called release button half-press; an S1 operation). In the description associated with FIG. 5, the same step numbers are assigned to the same processes as in FIG. 4 and a duplicate description thereof will be omitted.

In the process of FIG. 5, the process of Step S5001 is performed after Steps S4001 and S4002.

In Step S5001, the camera system control unit 5 starts imaging of the first frame. At this time, the main subject movement detection unit 5a starts a process of detecting the motion of the main subject. In the second embodiment, it is possible to acquire, as a second image, a live view image in parallel with the imaging of the first image for HDR imaging or high-resolution imaging. For this reason, the camera system control unit 5 can drive the camera-side blur correction unit 14 so that the position of the main subject is kept constant within the angle of view also during imaging for HDR imaging or high-resolution imaging. The process of detecting the motion of the main subject is performed until the imaging for a predetermined number of images is completed (YES of Step S4010).

After the process of Step S5001, the process proceeds to the process of Step S4004. Since the position of the main subject can be acquired all the time after Step S5001, in FIG. 5, the process of Step S4005 is not performed. For this reason, when the imaging of the first frame is completed in Step S4004 of FIG. 5, the process proceeds to the process of Step S4006. The subsequent process of Steps S4006 to S4014 is the same as in FIG. 4.

Also in the above second embodiment, the same effect as that of the first embodiment can be obtained. Particularly, since the camera-side blur correction unit 14 can be driven so the position of the main subject is kept constant within the angle of view also during imaging for HDR imaging or high-resolution imaging in the second embodiment, a combined image in which the motion of the main subject is further reduced is easily generated.

The present invention can also be realized using a process of supplying a program that realizes one or more functions of the above embodiments to a system or a device over a network or via a storage medium and reading and performing, by one or more processors in a computer of the system or the device, the program. Furthermore, the present invention can also be realized using a circuit (for example, an ASIC) configured to implement one or more functions.

Also, for example, the main subject movement detection unit 5a in the above embodiments may detect the motion of a main subject using a first image used for a combination for HDR imaging or high-resolution imaging and the camera-side blur correction unit 14 may be driven using imaging of a first image which will be performed subsequently. Furthermore, although an example in which images are combined using a camera has been described in the above embodiments, a system in which a plurality of images obtained by performing multiple imaging using a camera are output to an external device and the plurality of images output from the camera are combined using the external device may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-11299, filed Jan. 28, 2020 which is hereby incorporated by reference wherein in its entirety.

What is claimed is:

1. An imaging device comprising:
   an imaging element configured to capture an image using a luminous flux passing through an imaging optical system;
   a blur corrector configured to move at least one of a part of the imaging optical system and the imaging element; and
   at least one processor and at least one memory functioning as:
   a movement detection unit configured to detect the motion of a main subject between images acquired at different times; and
   an imaging control unit configured to perform control so that multiple imaging is performed on the main subject under different imaging conditions to obtain a plurality of images to be combined,
   wherein the imaging control unit performs a second image capture after performing a first image capture to obtain the plurality of images to be combined,. and causes the blur corrector to be driven based on the motion of the main subject detected by the movement detection unit using images obtained from the imaging element during a period between the end of the first image capture and the start of the second image capture, in the period from the end of the first imaging capture to the start of the second image capture.

2. The imaging device according to claim 1, wherein the imaging control unit acquires images having different exposures in each of the multiple imaging so that a combined image having a wider dynamic range than that before the combining is obtained.

3. The imaging device according to claim 2, wherein the imaging control unit changes driving of the blur corrector in the multiple imaging on the basis of the exposure of a region of a background excluding the main subject.

4. The imaging device according to claim 1, wherein the imaging control unit causes the imaging element to be slightly moved in the multiple imaging so that a combined image having a higher resolution than that before the combining is obtained.

5. The imaging device according to claim 4, wherein the imaging control unit corrects a minute movement amount of the imaging element for each imaging at the time of the multiple imaging and calculates an amount of movement of the imaging element using the blur corrector.

6. The imaging device according to claim 1, wherein the main subject is set on the basis of a gaze point of a user or a focus point.

7. The imaging device according to claim 1, wherein the imaging control unit causes the blur corrector to be driven so that the motion of the main subject is reduced when the motion of the main subject is larger than a predetermined amount in the multiple imaging.

8. The imaging device according to claim 1, wherein the movement detection unit detects the motion of the main subject using a first image obtained from the imaging element and a second image obtained from the imaging element separately from the first image in the multiple imaging.

9. A control method for an imaging device which includes: an imaging element configured to capture an image using a luminous flux passing through an imaging optical system; and a blur corrector configured to move at least one of a part of the imaging optical system and the imaging element, wherein the control method comprises:

detecting the motion of a main subject between images acquired at different times; and performing control so that multiple imaging is performed on the main subject under different imaging conditions to obtain a plurality of images to be combined, and wherein, in the performing control, a second image capture is performed after performing a first image capture to obtain the plurality of images to be combined, and the blur corrector is driven based on the detected motion of the main subject using images obtained from the imaging element during a period between the end of the first image capture and the start of the second image capture, in the period from the end of the first image capture to the start of the second image capture.

10. The imaging device according to claim 8, wherein the second image is not an image to be combined.

11. The imaging device according to claim 8, wherein the second image is used for live view.

12. The imaging device according to claim 8, wherein the second image is an image obtained from the imaging element during the period between the end of the first image capture and the start of the second image capture.

* * * * *